United States Patent
Kim et al.

(10) Patent No.: US 11,664,018 B2
(45) Date of Patent: May 30, 2023

(54) DIALOGUE SYSTEM, DIALOGUE PROCESSING METHOD

(71) Applicants: HYUNDAI MOTOR COMPANY, Seoul (KR); KIA MOTORS CORPORATION, Seoul (KR)

(72) Inventors: Seona Kim, Seoul (KR); Youngmin Park, Seoul (KR); Jeong-Eom Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 209 days.

(21) Appl. No.: 17/119,344

(22) Filed: Dec. 11, 2020

(65) Prior Publication Data

US 2021/0335347 A1   Oct. 28, 2021

(30) Foreign Application Priority Data

Apr. 22, 2020 (KR) .......... 10-2020-0048707

(51) Int. Cl.
   *G10L 15/22*    (2006.01)
   *G10L 15/18*    (2013.01)
   *G10L 15/06*    (2013.01)

(52) U.S. Cl.
   CPC ........ *G10L 15/1815* (2013.01); *G10L 15/063* (2013.01); *G10L 15/22* (2013.01); *G10L 2015/223* (2013.01)

(58) Field of Classification Search
   CPC .... G10L 15/1815; G10L 15/22; G10L 15/063
   See application file for complete search history.

(56) References Cited

U.S. PATENT DOCUMENTS

| 2013/0080177 | A1* | 3/2013 | Chen | G10L 15/26 |
| | | | | 704/275 |
| 2019/0279611 | A1* | 9/2019 | Naganuma | G10L 17/26 |

FOREIGN PATENT DOCUMENTS

| KR | 10-2014-0139922 A | 12/2014 |
| KR | 10-2018-0086718 A | 8/2018 |
| KR | 10-2019-0109864 A | 9/2019 |

* cited by examiner

*Primary Examiner* — Ibrahim Siddo
(74) *Attorney, Agent, or Firm* — Morgan, Lewis & Bockius LLP

(57) ABSTRACT

A dialogue system includes a Speech to Text (STT) engine configured to convert a user speech into a spoken text; a learning-based dialogue engine configured to determine a user intention corresponding to the spoken text; a storage configured to store learning data used for learning of the dialogue engine; and a controller configured to determine an actual user intention based on at least one of context information or an additional user speech, match a spoken text failing to determine the user intention with the actual user intention when the dialogue engine fails to determine the user intention corresponding to the spoken text, and the dialogue engine may perform learning using the spoken text stored in the storage and the actual user intention.

18 Claims, 10 Drawing Sheets

DIALOGUE SYSTEM, DIALOGUE PROCESSING METHOD

CROSS-REFERENCE TO RELATED APPLICATION

This application is based on and claims the benefit of priority to Korean Patent Application No. 10-2020-0048707, filed on Apr. 22, 2020 in the Korean Intellectual Property Office, the disclosure of which is incorporated by reference in its entirety.

TECHNICAL FIELD

Embodiments of the present disclosure relate to a dialogue system, a controlling method of a dialogue system capable of providing a service corresponding to a user's speech.

BACKGROUND

A dialogue system is a system that can recognize a user's speech and provide a service corresponding to the recognized user's speech.

The main components of the dialogue system are STT (Speech to Text) engine that performs speech recognition on the user's speech input as a speech signal and converts it into a text, and a Natural Language Understanding (NLU) engine that understands user intent by applying natural language understanding technology to the converted text.

STT engine misrecognition or ambiguity in the user's speech causes the NLU engine fails to grasp the user intent, or the user intent identified by the NLU engine is different from the actual user intent. As a result, the level of trust in the dialogue system and satisfaction with the services provided by the dialogue system decreases.

The information disclosed in the Background section above is to aid in the understanding of the background of the present disclosure, and should not be taken as acknowledgement that this information forms any part of prior art.

SUMMARY

According to an aspect of the present disclosure, a dialogue system and a dialogue system control method can improve the accuracy of an STT engine or an NLU engine by grasping an actual user intention based on context information after a user speech is input or an additional user speech and by using it for learning when the user intention corresponding to the user speech is not properly identified.

In accordance with exemplary embodiments of the disclosure, a dialogue system includes: a Speech to Text (STT) engine configured to convert a user speech into a spoken text; a learning-based dialogue engine configured to determine a user intention corresponding to the spoken text; a storage configured to store learning data used for learning of a dialogue engine; and a controller configured to determine an actual user intention based on at least one of context information or additional user speech, to match the spoken text, by which the dialogue engine failed to determine the user intention, with actual user intention when the dialogue engine fails to determine the user intention corresponding to the spoken text, and to store the spoken text and the actual user intention in the storage.

The dialogue engine may perform the learning periodically or when a predetermined event occurs.

The dialogue system may further include a communicator configured to receive the context information from an electronic device registered in the dialogue system.

The context information may include at least one of information on an operation of the electronic device executed after the user speech is input or information on a user's behavior.

The dialogue engine may output a system speech to confirm the determined user intention when determining the user intention is successful.

The controller may determine the actual intention of the user based on at least one of context information acquired before and after the user's speech is input or additional user speech inputted after the system speech, and match the spoken text with the actual user intention of the user and store the spoken text in the storage when a negative user response is input to the determined user intention.

The controller may generate a control command for performing an action corresponding to the determined user intention when the controller succeeds in determining the user intention.

The controller may determine the actual user intention based on the received context information, match the spoken text with the actual user intention, and store the matched spoken text in the storage when the context information indicating the execution of an action opposite to the performed action and an additional action is received after the action corresponding to the determined user intention is performed.

The controller may match and store the user speech, the spoken text, and the actual user intention in the storage, and the STT engine may perform learning using the user speech, the spoken text, and the actual user intention stored in the storage.

The dialogue engine may generate system speech to confirm the determined actual user intention, and the controller may match the spoken text failing to determine the user intention with the actual user intention and store the spoken text in the storage when a positive response from the user is input to the system speech.

In accordance with exemplary embodiments of the disclosure, a dialogue processing method comprises: converting a user speech into a spoken text in a Speech to Text (STT) engine; determining a user intention corresponding to the spoken text based on learning in a dialogue engine; determining an actual user intention based on at least one of context information or an additional user speech; matching the spoken text, by which the dialogue engine failed to determine the user intention, with the actual user intention when the dialogue engine fails to determine user intention corresponding to the spoken text, and storing the spoken text and the actual user intention in a storage; and performing learning of the dialogue engine using the speech text and the actual user intention.

The method may further include performing, by the dialogue engine, the learning periodically or when a predetermined event occurs.

The method may further include receiving, by a communicator, the context information from an electronic device registered in a dialogue system.

The context information may include at least one of information on an operation of the electronic device executed after the user speech is input or information on a user's behavior.

The method may further include outputting a system speech to confirm the determined user intention when determining the user intention is successful.

The method may further include determining the actual user intention based on at least one of the context information acquired before and after the user's speech is input or the additional user speech inputted after the system speech when a negative user response is input to the determined user intention; and matching the spoken text with the actual user intention of the user and storing the spoken text in the storage.

The method may further include generating a control command for performing an action corresponding to the determined user intention when the controller succeeds in determining the user intention.

The method may further include determining the actual user intention based on the received context information when the context information indicating the execution of an action opposite to the performed action and an additional action is received after the action corresponding to the determined user intention is performed; and matching the spoken text with the actual user intention and storing the spoken text in the storage.

The method may further include matching and storing the user speech, the spoken text, and the actual user intention in the storage, and performing learning using the user speech, the spoken text, and the actual user intention stored in the storage.

BRIEF DESCRIPTION OF THE DRAWINGS

These and/or other aspects of the disclosure should become apparent and more readily appreciated from the following description of embodiments, taken in conjunction with the accompanying drawings of which.

DETAILED DESCRIPTION OF THE EMBODIMENTS

Figure 1:
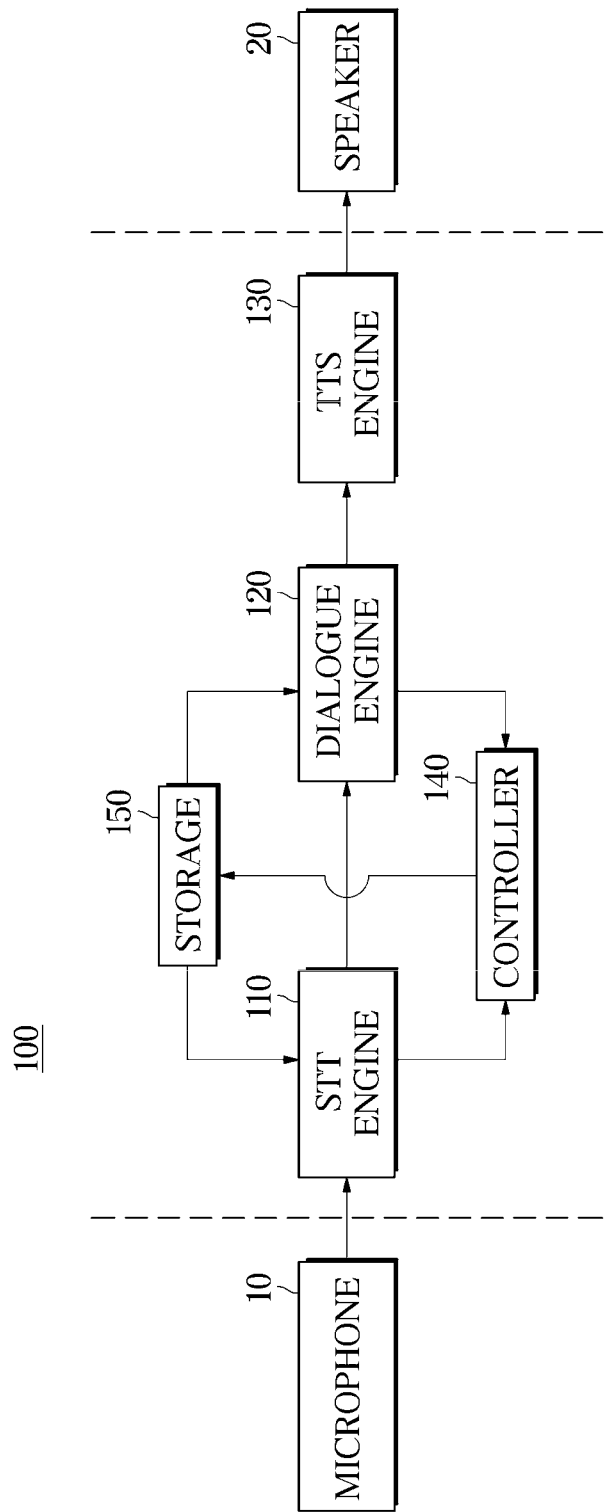
FIG. 1 is a control block diagram of a dialogue system according to an exemplary embodiment.

Configurations shown in the embodiments and drawings described herein show various examples of the disclosure. There may be various modifications that can replace the embodiments and drawings of the present specification at the time of filing of the present application.

Also, the terminology used herein is for the purpose of describing particular embodiments only and is not intended to be limiting of the disclosure. Singular expressions include plural expressions unless the context clearly indicates otherwise. As used herein, the terms "comprise", or "have" are intended to designate that the features, numbers, steps, actions, components, parts, or combinations thereof described in the specification are present. The terms do not preclude the existence or addition of one or more other features or numbers, steps, operations, components, parts or combinations thereof in advance.

In addition, terms such as "~part", "~group", "~block", "~member", "~module" may refer to a unit for processing at least one function or operation. For example, the terms may refer to at least one hardware processed by at least one piece of hardware such as a field-programmable gate array (FPGA)/application specific integrated circuit (ASIC), at least one software stored in a memory, or a processor.

In addition, ordinal numbers such as "first" and "second" used before the components described herein are merely used to distinguish the components from each other. The ordinal numbers used before the components are not used to specify the order of connection between these components and the order of use thereof. The ordinal numbers do not have a different meaning, such as priority.

The references attached to the steps are used to identify the steps. These references do not indicate the order between the steps. Each step is performed in a different order than the stated order unless the context clearly indicates a specific order.

On the other hand, the disclosed embodiments may be implemented in the form of a recording medium for storing instructions executable by a computer. Instructions may be stored in the form of program code and, when executed by a processor, may generate a program module to perform the operations of the disclosed embodiments. The recording medium may be implemented as a computer-readable recording medium.

Computer-readable recording media may include all kinds of recording media having stored thereon instructions which can be read by a computer. For example, there may be a read only memory (ROM), a random-access memory (RAM), a magnetic tape, a magnetic disk, a flash memory, an optical data storage device, and the like.

Further, when an element in the written description and claims is described as being "for" performing or carry out a stated function, step, set of instructions, or the like, the element may also be considered as being "configured to" do so.

Hereinafter, an exemplary embodiment of a dialogue system, a dialogue processing method are described in detail with reference to the accompanying drawings.

FIG. 1 is a control block diagram of a dialogue system according to an exemplary embodiment. Referring to FIG. 1, a dialogue system 100 according to an embodiment may include: a Speech to Text (STT) engine 110 configured to convert a user speech into text; a learning-based dialogue engine 120 configured to determine user intention corresponding to the spoken text; a storage 150 configured to store learning data used for learning of a dialogue engine 120; and a controller 140 configured to determine actual user intention based on at least one of context information or additional user dialogue, match a spoken text by which the dialogue engine failed to determine the user intention to the actual user intention when the dialogue engine fails to determine user intention corresponding to the spoken text, and store the spoken text and the actual user intention matched to the spoken text.

According to an exemplary embodiment of the present disclosure, the dialogue system 100 may be implemented as a server. In this case, the components 110, 120, 130, 140, and 150 of the dialogue system 100 may be provided in the server. However, it is also possible for some of the components 110, 120, 130, 140, 150 of the dialogue system 100 to be provided in a user terminal connecting the dialogue system 100 with the user.

According to an exemplary embodiment of the present disclosure, the dialogue system 100 may include at least one non-transitory memory for storing a program and related data, and at least one processor for executing the stored program.

In one exemplary embodiment, the STT engine 110, the dialogue engine 120, the TTS engine 130, the controller 140 may include separate memory and processors (e.g., computer, microprocessor, CPU, ASIC, circuitry, logic circuits, etc.), some of which may share memory and processors. In addition, the storage 150 may or may not share the memory with the STT engine 110, the dialogue engine 120, the TTS engine 130, and the controller 140.

In addition, the controller 140 may be provided in a separate configuration, but operations of the controller 140 to be described later may be performed in a configuration related to the corresponding operation among the STT engine 110 and the dialogue engine 120. For example, among the operations of the controller 140 to be described later, operations related to the control of the dialogue engine 120 may be directly performed by the dialogue engine 120. That is, the components in this embodiment are classified based on the operation, not the physical location or configuration, and no dialogue system has a separate processor called the control unit. Even if a processor referred to as a dialog engine performs the operation of the controller 140 described in the claims of the present specification, it does not depart from the scope of the rights of the dialogue system 100 according to an embodiment.

For example, when the user terminal is a vehicle, some of the components of the dialogue system 100 may be provided in the vehicle. When the user terminal is a mobile device such as a smartphone, a smart artificial intelligence (AI) speaker or a PC, some of the components of the dialogue system 100 may be provided in the mobile device, the AI speaker or the PC.

Alternatively, the user may download and use a program for performing some functions of the components of the dialogue system 100 on the user terminal.

The microphone 10 and the speaker 20 may be provided in a user terminal such as a vehicle, a mobile device, or a PC. The user terminal may be connected to the dialogue system 100 through wireless communication.

The user speech input to the microphone 10 may be input to the STT engine 110 in the form of a voice signal.

The STT engine 110 may convert speech into text by applying a speech recognition algorithm to user speech transmitted in the form of a streaming signal. For example, feature vector extraction techniques such as Cepstrum, Linear Predictive Coefficient (LPC), Mel Frequency Cepstral Coefficient (MFCC), or Filter Bank Energy by applying the feature vector of the voice signal corresponding to the user speech may be extracted.

The recognition result may be obtained by comparing the extracted feature vector with the trained reference pattern. To this end, an acoustic model for modeling and comparing signal characteristics of speech and a language model for modeling linguistic order relations such as words or syllables corresponding to a recognized vocabulary may be used.

The STT engine 110 may be a learning-based engine applying machine learning or deep learning in converting a user speech, which is a speech signal, into text, STT learning data used for learning of the STT engine 110 may be stored in storage 150.

STT learning data can be continuously updated, and the STT engine 110 may perform learning periodically or when a specific event occurs. For example, when a certain amount of learning data is added, STT learning data can be updated by performing retraining using the learning data stored in storage 150.

Since the spoken text, which is the output of the STT engine 110, is a result generated by the STT engine 110 performing speech recognition, misrecognition may occur due to various factors such as the performance of the STT engine 110 or the quality of the speech signal. For this reason, the actual users speech input into the microphone 10 may not match its contents.

For example, the user said "turn on the air conditioner", but the STT engine 110 incorrectly recognizes this and outputs "turn on aiet" as a text. Accordingly, in an exemplary embodiment to be described later, in order to distinguish between a user speech in the form of a speech signal that is an input of the STT engine 110 and a text that is an output of the STT engine 110, the input of the STT engine 110 is referred to as a user speech and the output of the STT engine 110 is referred to as a spoken text.

The spoken text output from the STT engine 110 is input to the dialogue engine 120, and the dialogue engine 120 analyzes the spoken text to determine a user intention corresponding thereto.

The dialogue engine 120 can apply Natural Language Understanding technology to determine the user intention corresponding to the spoken text.

Therefore, the dialogue engine 120 may include an NLU engine that performs natural language understanding by applying NLU technology to an input sentence.

For example, the dialogue engine 120 can recognize entity names from spoken text. The entity name is a proper noun such as a person's name, place name, organization name, time, date, currency, etc., and entity name recognition is the task of identifying the entity name in a sentence and determining the type of the identified entity name. Through entity name recognition, important keywords can be extracted from sentences and the meaning of sentences can be grasped.

Also, the dialogue engine 120 can extract domains from spoken text. The domain is capable of identifying the subject of a user's speech. For example, domains representing various subjects such as home appliance control, text, navigation, schedule, weather, traffic, vehicle control, etc. may be extracted from the spoken text.

Also, the dialogue engine 120 can analyze the dialogue behavior of spoken text. Speech act analysis is the task of analyzing the intention of speech. It is to identify the intention of speech such as whether the user asks a question, makes a request, responds, or expresses a simple emotion.

In addition, the dialogue engine 120 may identify a user intent based on information such as a domain corresponding to the spoken text, an entity name, and a dialogue act, and extract an action corresponding to the user intention. Actions can be defined by an object and an operator.

For example, if the identified user intention is [Run Air conditioner], the corresponding action may be defined as "Air conditioner(object)_ON (operator)". When the identified user intention is [Run washing machine], the corresponding action may be defined as "washing machine (object)_ON (operator)".

In addition, the dialogue engine 120 can extract parameters related to action execution. Arguments related to action execution may be valid factor directly required to perform an action, it may also be an invalid factor used to extract such a valid factor.

For example, if the spoken text output by the STT engine 110 is "Run air conditioner at 20 degrees", the dialogue engine determines the domain corresponding to the user's speech as "control of home appliances", the action can be determined as "Air Conditioner_ON". The dialogue behavior corresponds to the ᵀR Request, 20 degrees corresponds to {factor: set temperature} required to perform an action.

The dialogue engine 120 may be a learning-based engine that applies machine learning or deep learning to understand user intentions from spoken text by performing natural language understanding, and the NLU learning data used for learning of dialogue engine 120 can be stored in storage 150.

NLU learning data can be continuously updated, and dialogue engine 120 may perform learning periodically or when a specific event occurs. For example, when a certain amount of learning data is added, and it can be updated by performing retraining using the learning data stored in storage 150.

The dialogue engine 120 can generate system speech according to the result of natural language understanding. When the NLU engine succeeds in identifying the user intention, it can generate a system speech to confirm the identified user intention. For example, if the user intention is [run air conditioner], then NLU engine can create a system speech "run air conditioner?", and If the user intention is [Send text], then NLU engine can create a system speech that says "Who will send the text with what content?"

Alternatively, if the NLU engine fails to determine the user intention, the NLU engine can generate a system speech indicating that the user intent was not understood, such as "I'm sorry" or "I don't know."

System speech can be generated by NLG (Natural Language Generating) engine, and the system speech generated by the NLG engine may be input to the TTS (Text to Speech) engine 130.

The TTS engine 130 may convert the system speech in text form into a speech signal and output it through the speaker 20.

As described above, there may be a case in which the STT engine 110 misrecognizes a speech and outputs spoken text with contents different from the actual user speech. In this case, there is a possibility that dialogue engine 120 will fail to determine user intention from spoken text.

Alternatively, even if the STT engine 110 outputs spoken text with content matching the actual user speech without misrecognizing the user speech, there is also the possibility that the dialogue engine 120 will fail to determine the user intention from the spoken text due to the ambiguity of the user speech itself.

If the dialogue engine 120 fails to determine the user intent corresponding to the spoken text, the controller 140 determines the actual user intention based on at least one of the context information or the additional user speech, and matches the spoken text that failed to determine the user intention with the actual user intention and stores it in the storage 150.

Figure 3:
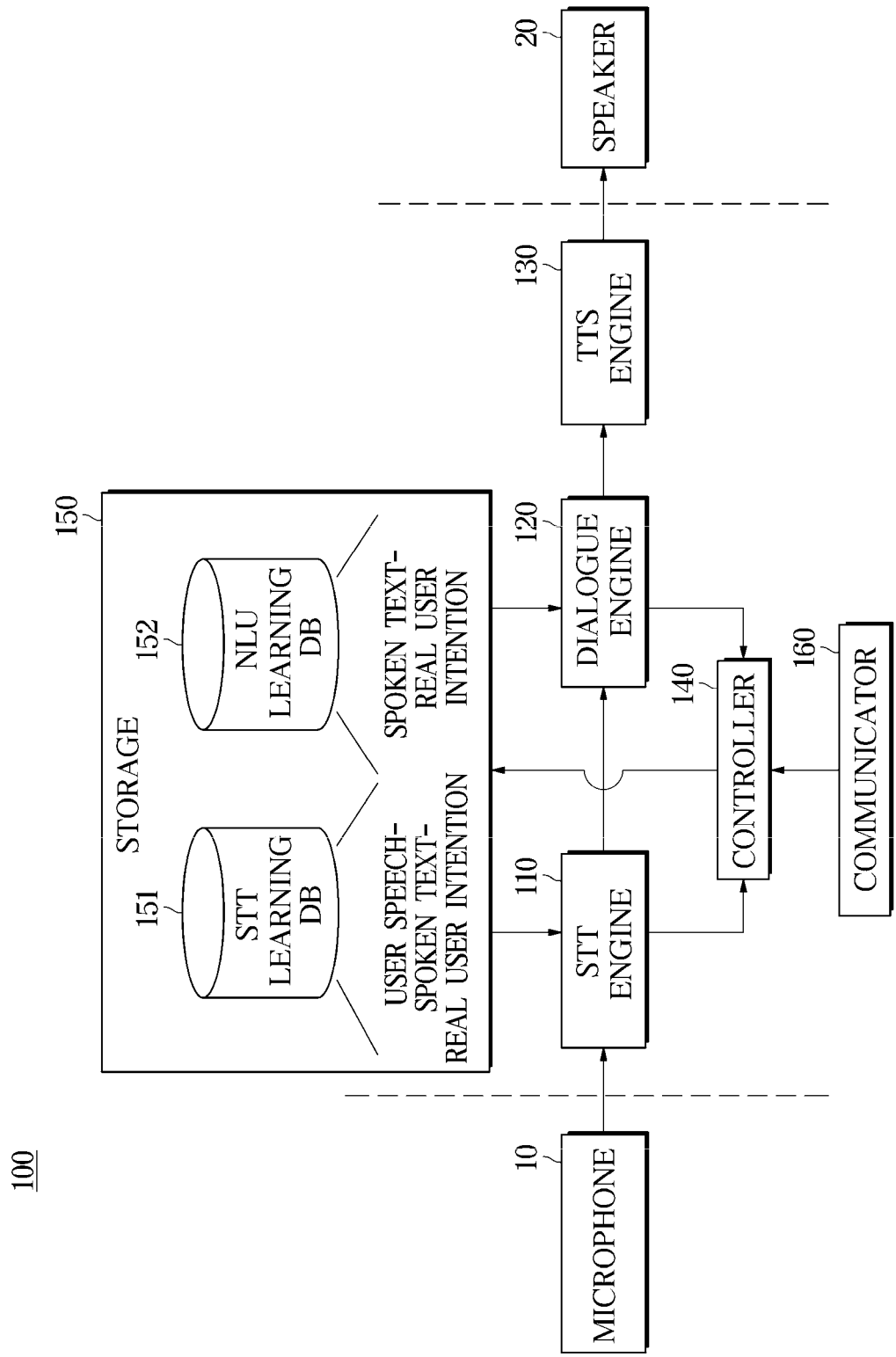
FIG. 3 is a control block diagram of a case where a dialogue system according to an exemplary embodiment of the present disclosure further includes a communicator.

In addition, the controller 140 may generate a control command for performing an action corresponding to a user intention, the generated control command may be transmitted to an electronic device or a server necessary for performing an action through a communicator 160 (see FIG. 3). For example, when an action to be performed is related to control of an electronic device, a control command for performing the action may be transmitted to the corresponding electronic device. The communicator 160 may be a hardware device implemented by various electronic circuits, e.g., processor, to transmit and receive signals via wireless or wired connections.

Figure 2:
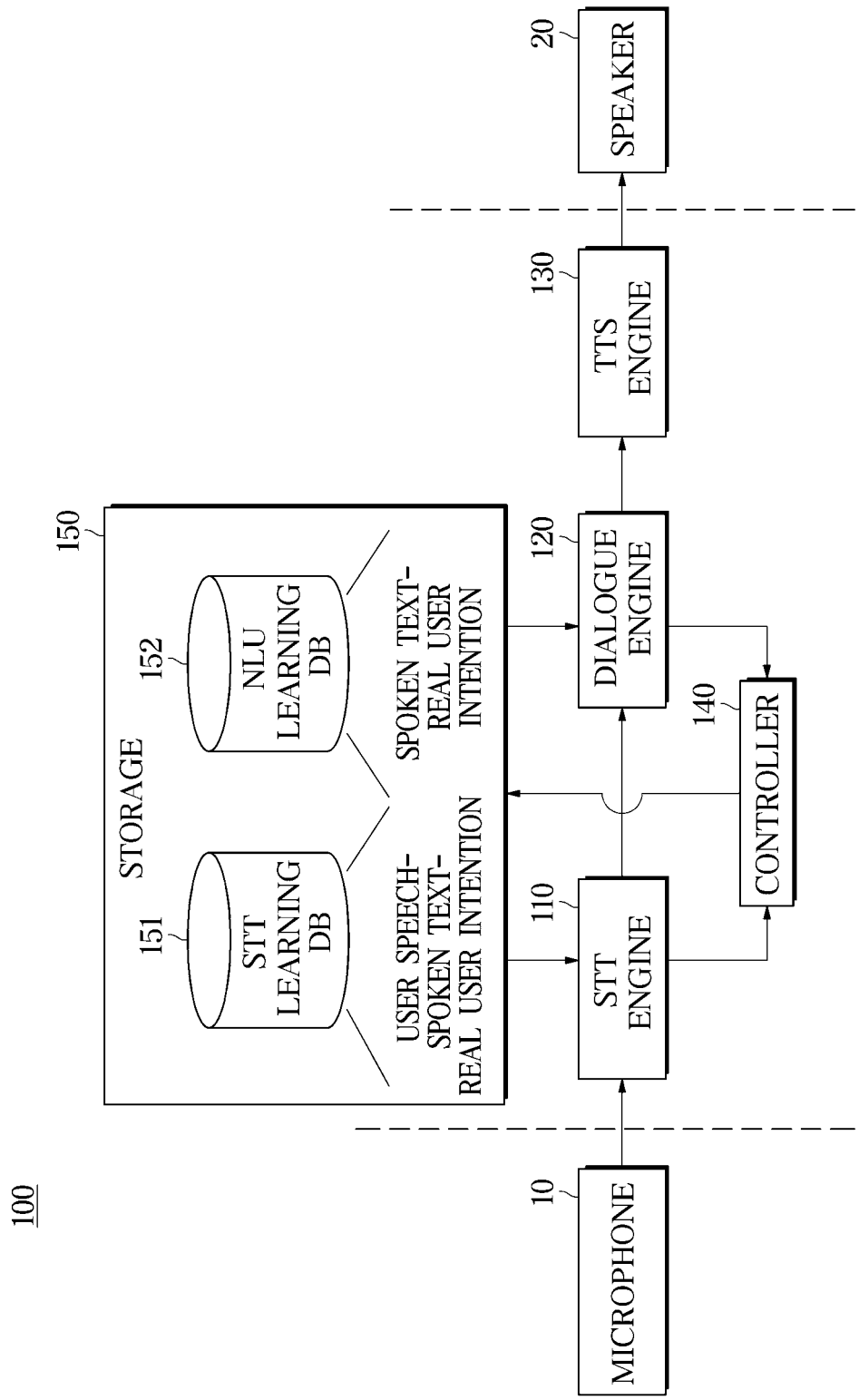
FIG. 2 is a control block diagram illustrating a database stored in a storage in a dialogue system according to an exemplary embodiment of the present disclosure.

FIG. 2 is a control block diagram illustrating a database stored in a storage in a dialogue system according to an exemplary embodiment. FIG. 3 is a control block diagram of a case where a dialogue system according to an exemplary embodiment further includes a communicator.

Referring to FIG. 2, storage 150 can store STT learning database 151 in which STT learning data used for learning of the STT engine 110, and an NLU learning database 152 in which NLU learning data used for learning of the NLU engine.

The storage 150 may include a nonvolatile memory such as a ROM, a flash memory, a magnetic computer memory device, an optical disk drive, or the like.

As described above, NLU learning data may be added to the NLU learning database 152 to be updated, and the dialogue engine 120 may perform relearning using the updated NLU learning database 152. In particular, the dialogue engine 120 performs re-learning using the spoken text that fails to determine the user intention and the learning data matched with the actual user intention, thereby lowering the probability of failure in determining the user intention and improving the accuracy.

The controller 140 may use at least one of context information or additional user speech to determine the actual user intention. Here, the context information may include at least one of information on a user's behavior acquired before and after a user speech is input or information on an operation of an electronic device executed after the user speech is input.

For example, information about a user's behavior may be obtained by a camera. That is, the information on the user's behavior may be an image of the user. When the dialogue system 100 is used in a vehicle, the camera may be a camera of a black box provided inside the vehicle. When the dialogue system 100 is used at home, the camera is a camera provided on an AI speaker or a camera provided on a TV, or a camera provided in a refrigerator. That is, information on the user's behavior may be obtained by a camera provided in an electronic device including a home appliance.

As a specific example, when a user feels hot, and a gesture such as fanning with his hand is captured in an image by a camera within a preset time before and after inputting a user's speech, the actual user intention may be determined to be related to the control of the air conditioner. Alternatively, when the user controlling the electronic device is photographed, the actual user intention may be determined to be related to the control of the electronic device.

Information on the operation of the electronic device may be provided from the corresponding electronic device. For example, the information on the operation of the electronic device may be information related to a change in an operation state, such as turning on/off the electronic device or changing a setting after a user speech is input.

Electronic devices may include home appliances and user terminals such as refrigerators, washing machines, air conditioners, air cleaners, robot cleaners, water purifiers, TVs, dryers, and clothes managers.

Referring to FIG. 3, the dialogue system 100 according to an exemplary embodiment of the present disclosure may further include a communicator 160 that communicates with an external device to exchange data. An external device that communicates with the communicator 160 may be an electronic device registered in the dialogue system 100 or an external server. Electronic devices registered in dialogue system 100 may include the aforementioned user terminals and home appliances.

When the received context information is information on user behavior acquired by the camera, the camera photographing the user may directly transmit information on the user's behavior to the dialogue system 100. Or when a camera is provided in the vehicle, the information on the user's behavior is transmitted to the dialogue system 100 through a communication module provided in the vehicle. Also, when a camera is provided in the user's home, and when an IoT infrastructure is established by network is formed between home appliances, information about user behavior can also be transmitted through a home appliance that acts as a hub or an AI speaker.

When the received context information is information on the operation of an electronic device, Information on the operation of the electronic device may be transmitted to the dialogue system 100 through a communication module provided in the corresponding electronic device. When an IoT infrastructure is in place, information about user behavior can be transmitted through home appliances or AI speakers that act as hubs.

In addition, the communicator 160 may communicate with an external server to perform an action corresponding to a user intention. For example, when an action corresponding to a user's intention is to provide specific information, information may be requested from an external server that provides the information and the corresponding information may be received from the external server.

Figure 4:
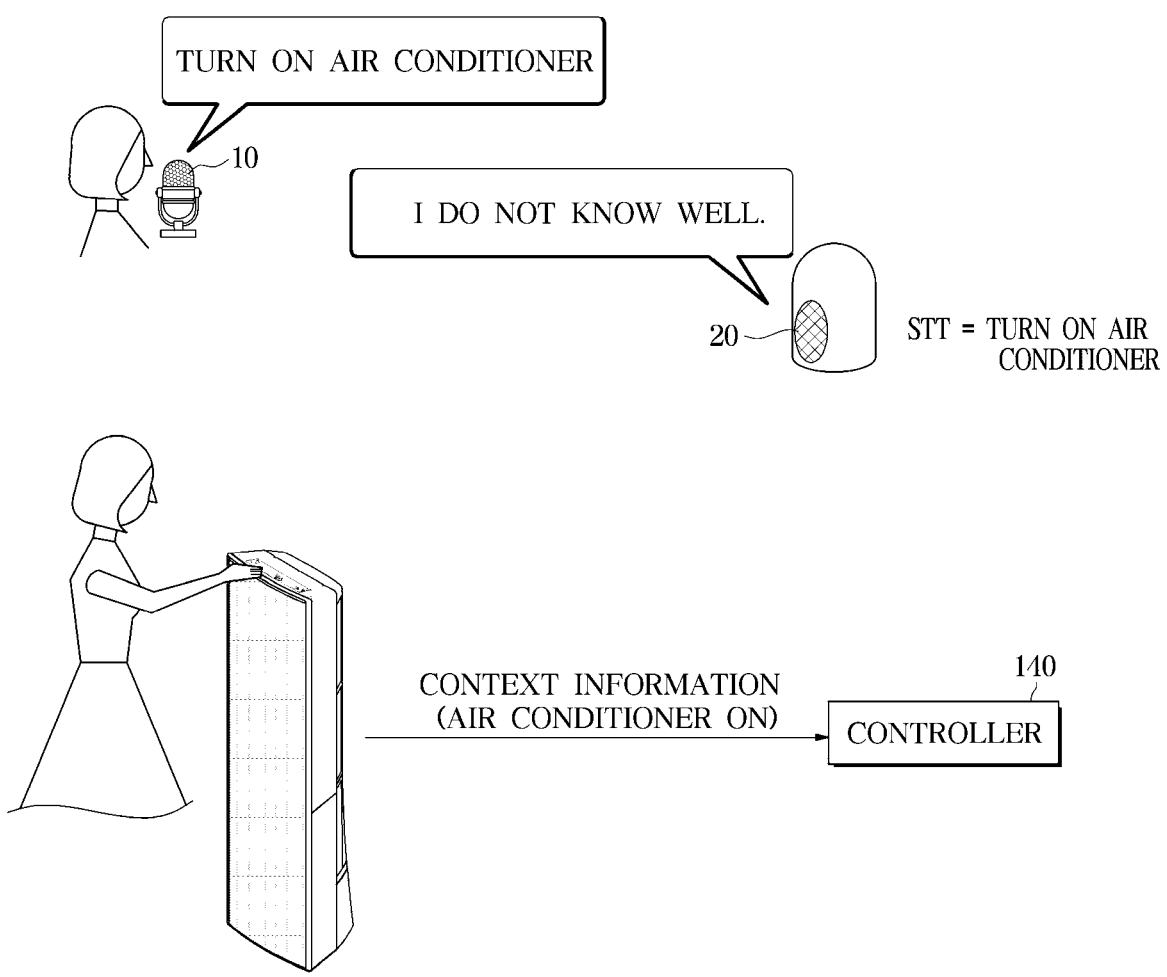
FIG. 4 is a diagram illustrating a context in which a dialogue system according to an exemplary embodiment of the present disclosure misrecognizes a user's speech.
Figure 5:
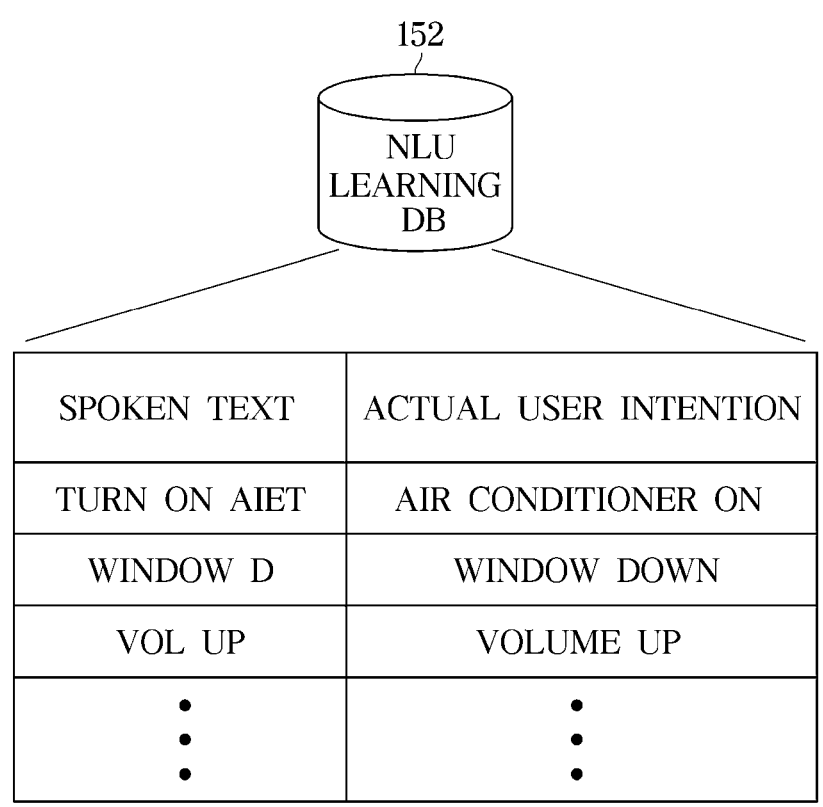
FIG. 5 is a diagram illustrating an example of learning data stored in a dialogue system according to an exemplary embodiment of the present disclosure.

FIG. 4 is a diagram illustrating a context in which a dialogue system according to an exemplary embodiment of the present disclosure misrecognizes a user's speech, and FIG. 5 is a diagram illustrating an example of learning data stored in a dialogue system according to an exemplary embodiment of the present disclosure.

Referring to FIG. 4, it is assumed that the user inputs a user speech "turn on the air conditioner" into the microphone 10, but the STT engine 110 incorrectly recognizes the inputted user speech and outputs the spoken text "turn on the aiet".

The spoken text "turn on the aiet" is input to dialogue engine 120, and dialogue engine 120 attempts to understand user intention by applying natural language understanding technology to the input spoken text. In case of failure to grasp the user intention, dialogue engine 120 can generate "I don't know well" as a system speech for it, and the generated system speech may be converted into a speech signal by the TTS engine 130 and output through the speaker 20.

In this case, the user may input additional user speech or may directly perform an intended action (air conditioner_ON) as illustrated in FIG. 3. Context information indicating that the air conditioner is turned on may be provided to the controller 140, and the controller 140 may determine that the actual user intention was [run air conditioner] from the provided context information (air conditioner on).

As shown in FIG. 5, the controller 140 may match the spoken text "turn on the aiet" which fails to grasp the user intention by the dialogue engine 120 with the actual user intention [run air conditioner] and store it in the NLU learning database 152. As in other examples, when the STT engine 110 misrecognizes the user speech and the dialogue engine 120 fails to determine the user intention, the spoken text output of the STT engine 110 and the actual user intention may be matched and stored.

The dialogue engine 120 can perform relearning using the learning data stored in the NLU learning database 152. If the learning is repeated in this way, even if the STT engine 110 misrecognizes the user's speech and outputs a text of content different from the user's speech, it is possible to properly grasp the users intention.

Further, the STT learning database 151 may also be updated by adding learning data, and the STT engine 110 may perform retraining using the updated STT learning database 151.

Referring back to FIG. 2, the controller 140 may match the user's speech and spoken text, which fail to determine the user's intention, with the actual users intention and store it in the STT learning database 151. Whenever the user intention determination fails or the determined user intention does not match the actual user intention, this process may be repeated while learning data may be accumulated in the STT learning database 151.

The STT engine 110 may improve speech recognition performance by performing re-learning using the user speech and spoken text stored in the STT learning database 151 and actual user intention corresponding thereto.

In the above example, the STT engine 110 misrecognized the user's speech. the embodiment of the dialogue system 100 may include a case in which the STT engine 110 properly recognizes the user speech, but the dialogue engine 120 fails to determine the user intention due to the ambiguity of the user speech itself.

Figure 6:
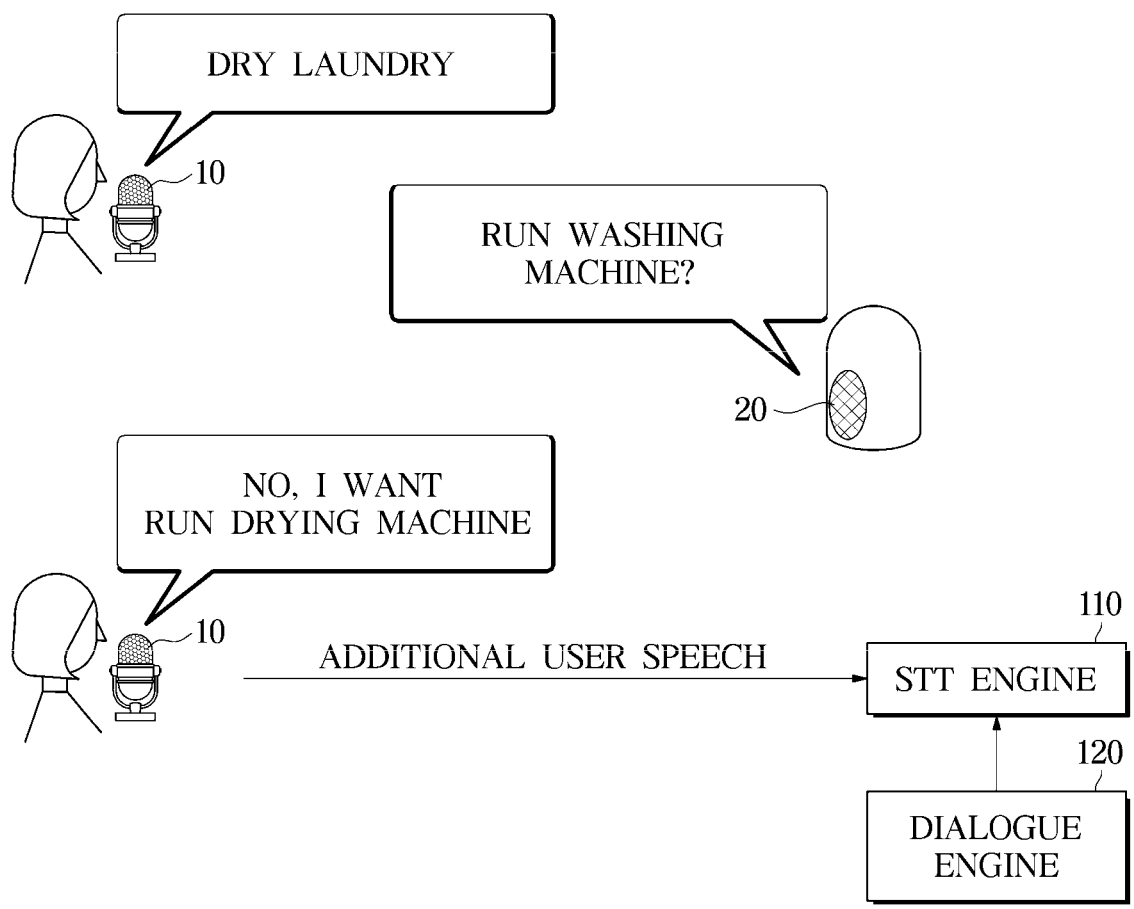
FIGS. 6, 7 and 8 are diagrams illustrating a context in which a dialogue system according to an exemplary embodiment of the present disclosure succeeds in determining a user intention, but the determined user intention does not match an actual user intention.
Figure 7:
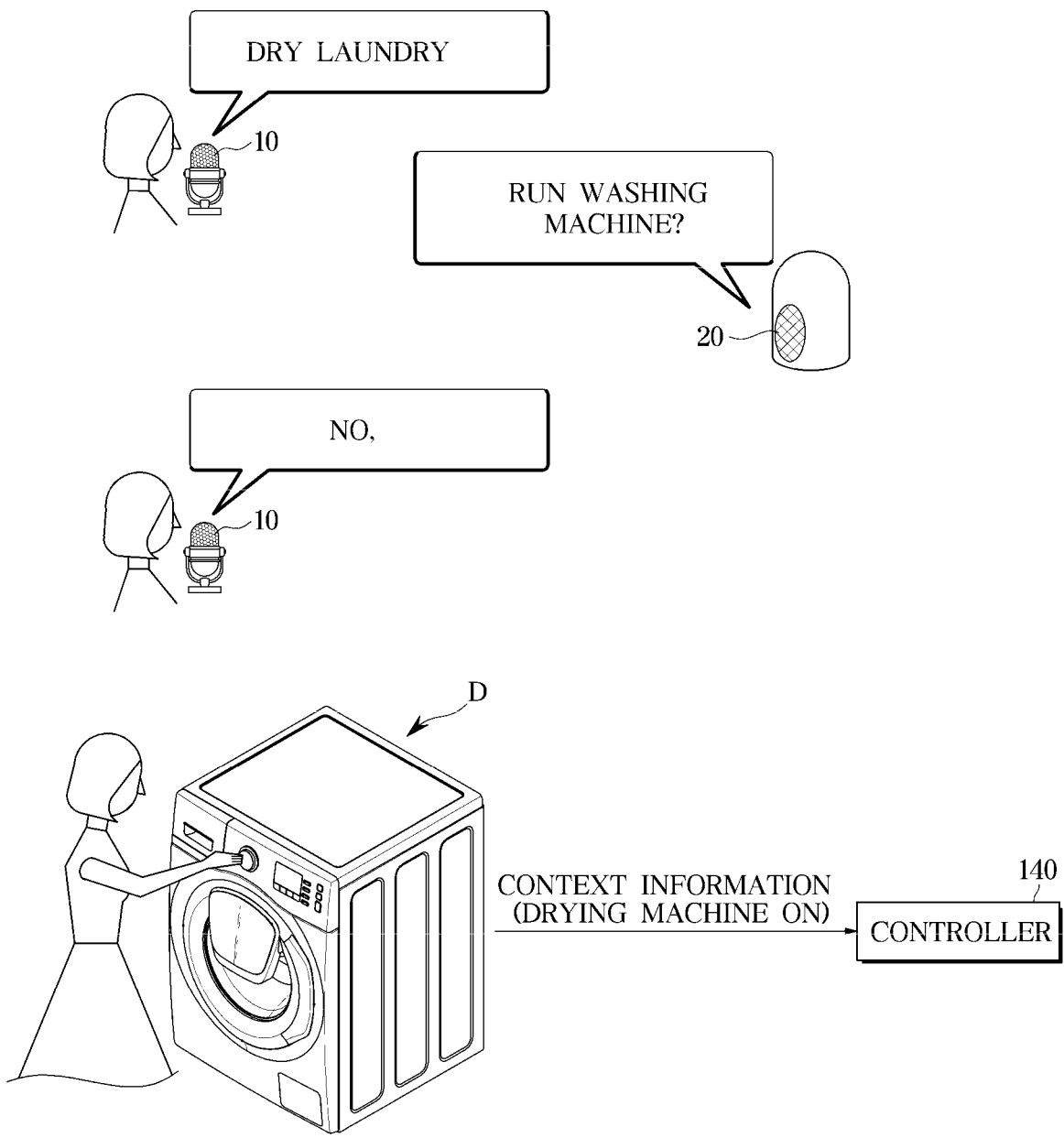
Figure 8:
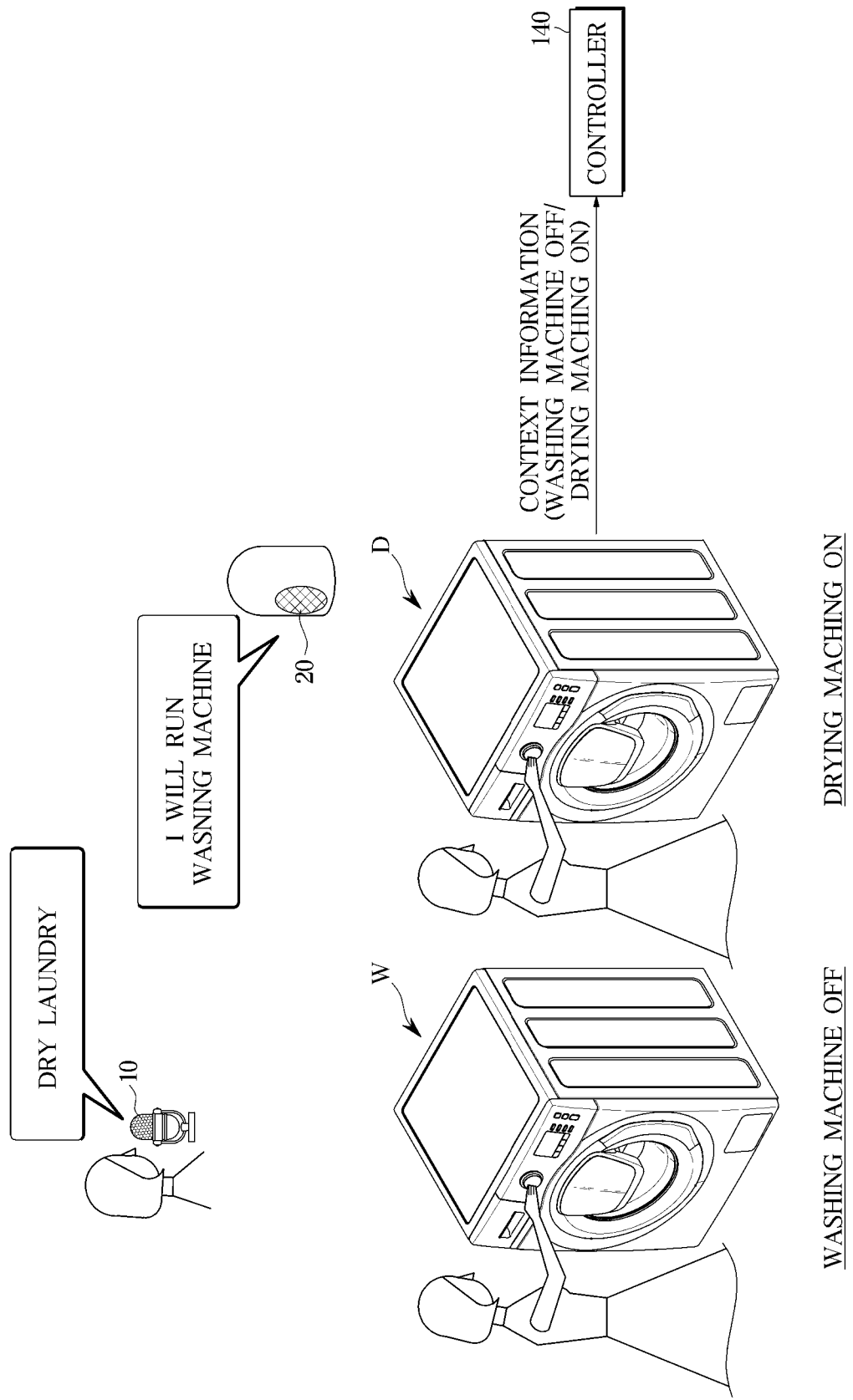
Figure 9:
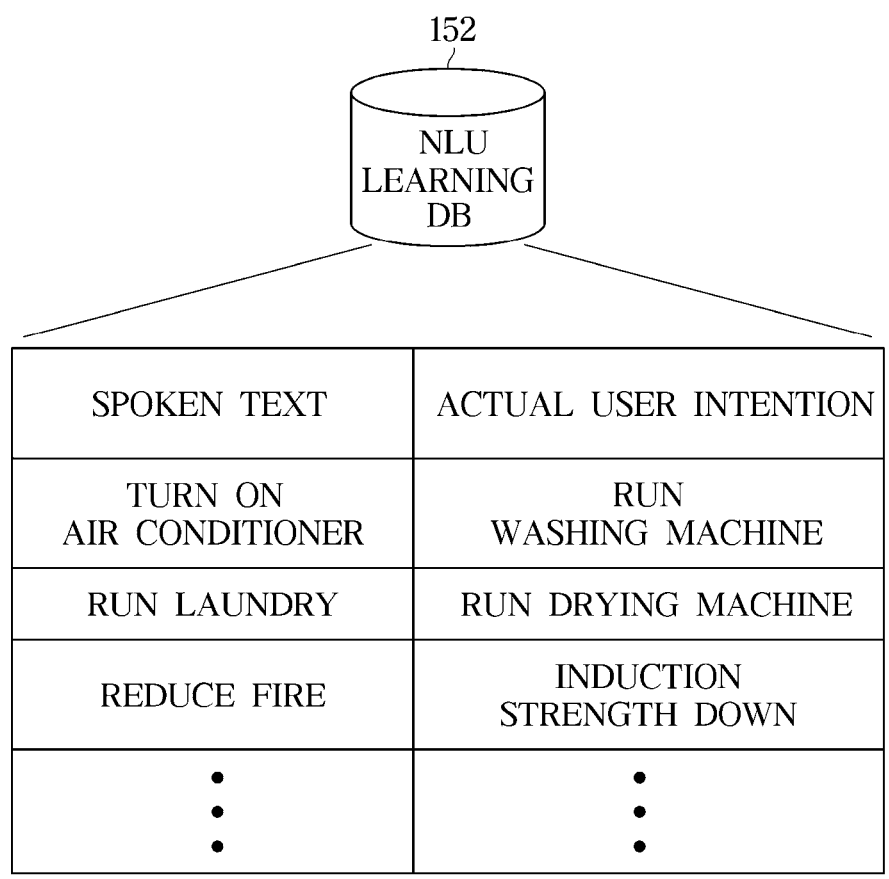
FIG. 9 is a diagram showing another example of learning data stored in a dialogue system according to an exemplary embodiment of the present disclosure.

FIGS. 6, 7 and 8 are diagrams illustrating a context in which a dialogue system according to an exemplary embodiment of the present disclosure succeeds in determining a user intention, but the determined user intention does not match an actual user intention, and FIG. 9 is another exemplary embodiment of the present disclosure illustrating learning data stored in the dialogue system.

Referring to the examples of FIGS. 6 and 7, a case in which the user inputs a user speech "dry laundry" into the microphone 10 and the STT engine 110 properly recognizes this and outputs the spoken text "dry laundry". In the example of FIGS. 6, 7 and 8, the actual user intention is to run the drying machine.

The spoken text "Dry laundry" is input to dialogue engine 120, and dialogue engine 120 applies natural language understanding technology to the input spoken text to determine a user intention. For example, the dialogue engine 120 can determine the user's intention as [run washing machine] from the word "laundry".

When the user intention determination is successful, the dialogue engine 120 may generate a system speech including information on the determined user intention in order to receive the user's confirmation of the determined user intention. For example, "run the washing machine?" as a system speech, and the generated system speech is converted into a speech signal in the TTS engine 130 and output through the speaker 20.

In this case, the user may input a positive user response or a negative user response to the determined user intention into the microphone 10. If the washing machine execution matches the actual user intention, the user may input a positive user response to the microphone 10, and if not, the user may input a negative user response to the microphone 10.

When a positive user response is input, the controller 140 may generate a control command for executing the washing machine according to the determined user intention, and transmit the generated control command to the washing machine through the communicator 160.

Communication between the dialogue system 100 and the washing machine may be performed directly without an intermediary, or may be performed through an AI speaker or other home appliance that serves as a hub.

When a negative user response is input, the controller 140 may determine an actual user intention based on the additional user speech or context information.

As mentioned earlier, the actual user intention in this example is [run drying machine]. Accordingly, the user may input a negative user response "no" as shown in the example of FIG. 6, and in addition to this, an additional user speech "run drying machine" indicating the actual user intention may be input.

The additional user speech input to the microphone 10 is converted into spoken text by the STT engine 110, and the converted spoken text may be input to the dialogue engine 120. The spoken text converted from the additional user speech is referred to as an additional spoken text to distinguish it from the converted spoken text from the initially input user speech.

The dialogue engine 120 can determine the actual user intention [run drying machine] by applying natural language understanding technology to the additional spoken text "run the drying machine" according to the above-described process, and output the system speech to confirm the user intention again.

When a positive user response is input to the output system speech, the controller 140 can generate a control command for executing the dryer and transmit it to the dryer, AI speaker, or hub home appliance through the communicator 160.

On the other hand, when the user intention determined by the dialogue system 100 does not match the actual user intention, as shown in the example of FIG. 7, the user may input only the negative user response "no" and perform an action corresponding to the actual user intention [run drying machine] without additional speech. When the drying machine D is turned on by the user, context information indicating that the drying machine is turned on is transmitted to the controller 140 through the communicator 160, and the controller 140 may determine an actual user intention based on the transmitted context information.

As another example, it is possible to perform an action corresponding to the determined user intention immediately without a confirmation procedure for the user intention determined by the dialogue engine 120. However, even in this case, as shown in FIG. 8, the system speech "run the washing machine" for providing information on the action to be performed may be output.

The user can perform actions and additional actions that are opposite to the unintended actions. The additional action means an action corresponding to the actual user intention. In this example, the user can turn off the turned on washing machine W again and turn on the drying machine D. Context information indicating an action execution (washing machine off) and an additional action (drying machine on) opposite to the action performed by the dialogue system 100 may be transmitted to the controller 140 through the communicator 160.

The controller 140 may determine an actual user intention based on the received context information. Specifically, when context information indicating action execution opposite to the performed action is received, the controller 140 can see that the user intention [run the washing machine], determined by the dialogue engine 120, does not match the actual user intention, and determine the actual user intention [run drying machine] based on context information indicating additional action execution.

As shown in FIG. 9, the controller 140 may match a spoken text with an actual user intention and store it in the NLU database 152. Here, the spoken text stored in the examples of FIGS. 6, 7 and 8 corresponds to a text "dry laundry" converted from the initially input user speech. If the NLU engine is updated by performing re-learning, even if an ambiguous user speech of the same or similar type as "Dry laundry" is input afterwards, the NLU engine with improved performance can determine [run drying machine] with the corresponding user intention.

Meanwhile, in the above-described examples of FIGS. 6, 7 and 8, the STT engine 110 properly recognizes the user's speech, and the dialogue engine 120 also successfully determines the user's intention, the case where the determined user intention does not match the actual user intention has been described. However, the embodiment of the dialogue system 100 is not limited thereto. Even when the STT engine 110 misrecognizes the user's speech, the dialogue engine 120 succeeds in determining the user's intention, and even in this case, the above-described embodiment can be applied.

That is, the embodiment of the dialogue system 100 may be applied when the user intention determination fails in the dialogue engine 120 and when the user intention determination succeeds in the dialogue engine 120, but the determined user intention does not match the actual user intention. In both cases, the STT engine 110 incorrectly recognizes the user's speech, and the STT engine 110 properly recognizes the user's speech, but may include both cases where the user speech itself has ambiguity.

In addition, it is possible to increase the reliability of the actual user intention by receiving confirmation of the actual user intention from the user after the controller 140 determines the actual user intention based on at least one of the context information or the additional user speech. To this end, the NLU engine generates a system speech to check whether the actual user intention determined by the controller 140 is the user intended, and the TTS engine 130 may convert the generated text-type system speech into a speech signal and output it through the speaker 20.

When a positive response is input from the user, the spoken text and the actual user intention can be matched and stored in storage 150.

Hereinafter, a method of controlling a dialogue system according to an embodiment will be described. In implementing the method of controlling the dialogue system according to an embodiment, the dialogue system 100 described above may be used. Accordingly, the contents described above with reference to FIGS. 1 to 9 can be applied to an embodiment of a method for controlling a dialogue system even if there are no separate explanations.

Figure 10:
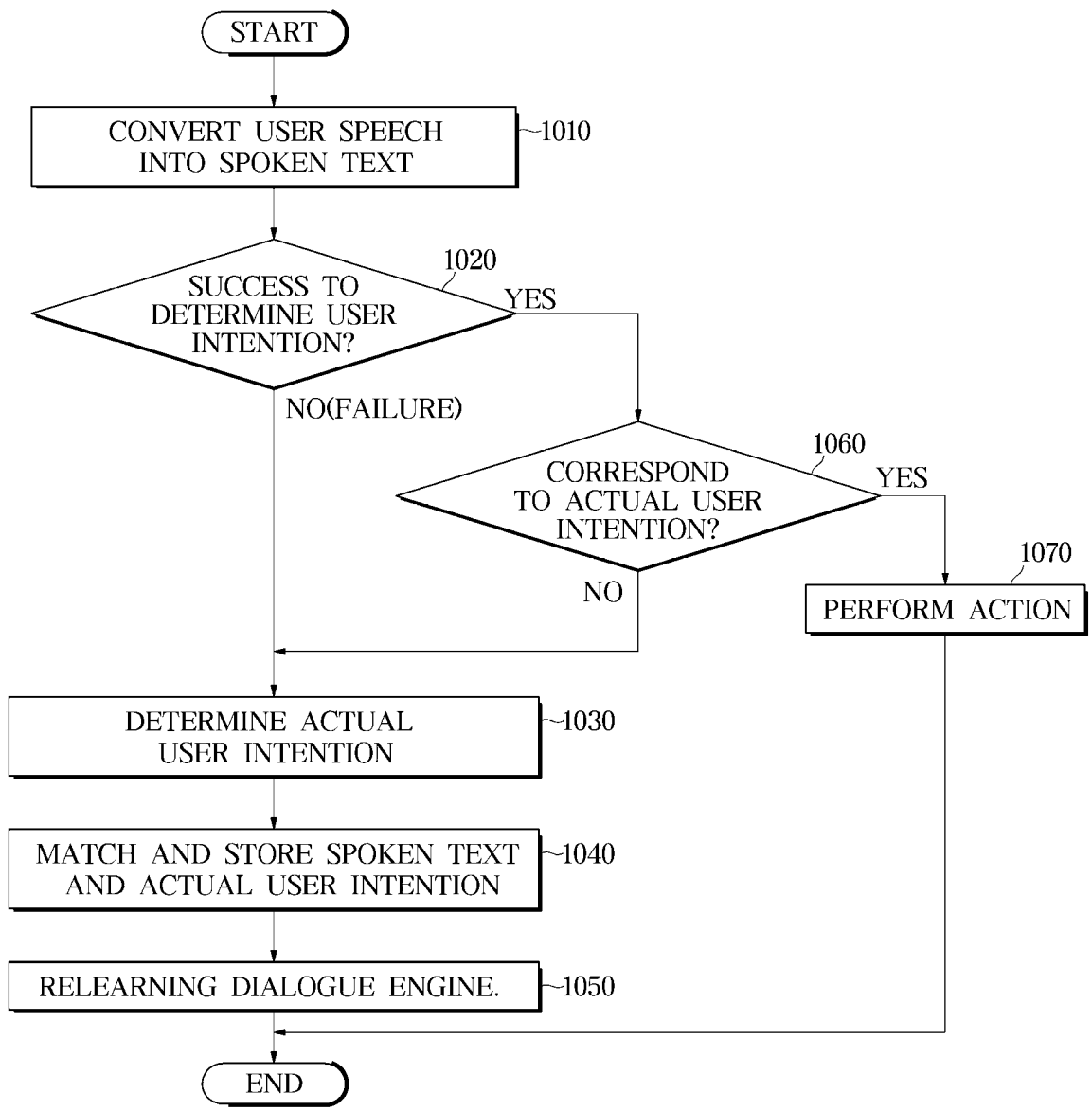
FIG. 10 is a flowchart of a method of controlling a dialogue system according to an exemplary embodiment of the present disclosure.

FIG. 10 is a flowchart of a method of controlling a dialogue system according to an exemplary embodiment of the present disclosure.

Referring to FIG. 10, the STT engine 110 converts the user's speech into a spoken text (1010), and the dialogue engine 120 determines a user intention corresponding to the spoken text based on learning (1020).

Here, the spoken text that is the output of the STT engine 110 may match the content of the user's speech, and the STT engine 110 may misrecognize the user's speech and output the spoken text with contents different from the user's speech.

The dialogue engine 120 may determine a user intention corresponding to the spoken text by applying a natural language understanding (NLU) technology to the spoken text output from the STT engine 110. The dialogue engine 120 may also be a learning-based engine applying machine learning or deep learning.

When the dialogue engine 120 fails to determine user intent corresponding to spoken text ('No' in 1020), the controller 140 determines an actual user intention based on at least one of context information or additional user speech (1030).

The context information may include one of information on the operation of the electronic device executed after the user's speech is input and information on the user's behavior. The electronic device is registered in the dialogue system 100 and may be a user terminal or home appliance as described above, context information may be received from an electronic device registered in the dialogue system 100.

The additional user speech may be an additional user speech input after failing to determine the user speech, when the STT engine 110 converts this into additional spoken text and inputs it into the dialogue engine 120, the dialogue engine 120 can determine the actual user intention by applying natural language understanding techniques to the additional spoken text.

A description of a specific process of determining the actual user intention is as described above with reference to FIG. 4.

The controller 140 matches the spoken text that failed to determine the user intention with the actual user intention and stores it in the storage 150 (1040). In particular, spoken text and actual user intention may be stored in the NLU learning database 152.

The dialogue engine 120 can be updated by performing relearning using spoken text stored in the NLU learning database and actual user intention. The relearning of dialogue engine 120 can be performed periodically or when a specific event occurs. As an example, the specific event may include the addition of learning data equal to or greater than a reference value. If the learning is repeated in this way, even if the STT engine 110 misrecognizes the user's speech and outputs a text of content different from the user's speech, it is possible to properly grasp the user's intention.

On the other hand, if the dialogue engine 120 succeeds in determining the user intention corresponding to the spoken text (example of 1020), it may be determined whether the determined user intention matches the actual user intention (1060).

For example, the dialogue system 100 may output a system speech for confirming the determined user intention, when a negative user response is input, it may be determined that the determined user intention does not match the actual user intention ('No' in 1060).

When the determined user intention does not match the actual user intention ('No' in 1060), the dialogue system 100 determines the actual user intention according to the above-described process (1030), after matching the spoken text, by which the dialogue engine failed to determine the user intention, to the actual user intention and storing them (1040), the dialogue engine 120 may perform relearning (1050).

When a positive user response is input to the system speech to confirm the determined user intent, it may be determined that the determined user intention matches the actual user intention (example of 1060).

If the determined user intention matches the actual user intention ('YES' in 1060), an action corresponding to the determined user intention may be performed (1070). In order to perform an action, the controller 140 may generate a control command for performing the action, and may transmit the generated control command to an electronic device or an external server through the communicator 160.

On the other hand, when the user intention determination is successful, the dialogue system 100 may perform an action corresponding thereto without outputting a system speech for confirming the determined user intention. In this case, when context information indicating the execution of the action opposite to the action performed after the action is performed and the additional action is received, the controller 140 may confirm that the determined user intention does not match the actual user intention, and determine the actual user intention based on the additional action.

Once the actual user intention is determined, as described above, the spoken text that failed to determine the user intention and the actual user intention may be matched and stored in the NLU learning database 152 (1040), and the dialogue engine 120 may perform re-learning using the stored data (1050).

In addition, the STT learning database 151 may also be updated by adding learning data, and the STT engine 110 may also perform re-learning using the updated STT learning database 151.

Specifically, the controller 140 may match the user's speech and spoken text, which fail to determine the user's intention, with the actual users intention and store it in the STT learning database 151. Whenever the user intention determination fails or the determined user intention does not match the actual user intention, this process may be repeated while learning data may be accumulated in the STT learning database 151.

The STT engine 110 may improve speech recognition performance by re-learning using the user speech and spoken text stored in the STT learning database 151 and actual user intention corresponding thereto.

In addition, it is possible to increase the reliability of the actual user intention by receiving confirmation of the actual user intention from the user after determining the actual user intention (1030). To this end, the NLU engine generates a system speech to check whether the actual user intention determined by the controller 140 is the user's intention, and the TTS engine 130 converts the generated system speech in the form of a text into a speech signal and output to the speaker 20.

When a positive answer is input from the user, the spoken text and the actual user intention may be matched and stored in the storage 150 (1040).

As described above, the disclosed embodiments have been described with reference to the accompanying drawings. Those having ordinary skill in the art should understand that the present disclosure can be implemented in a form different from the disclosed embodiments without changing the technical spirit or essential features of the present disclosure. The disclosed embodiments are examples and should not be construed as limiting.

According to the dialogue system and its control method according to one aspect, if the user's intention corresponding to the user's speech is not properly identified, the accuracy of the STT engine or the NLU engine can be improved by grasping the actual user intention based on the context information after the user speech is input or the additional user speech and using it for learning.

What is claimed is:

1. A dialogue system comprising:
    a Speech to Text (STT) engine configured to convert a user speech into a spoken text;
    a learning-based dialogue engine configured to determine a user intention corresponding to the spoken text;
    a storage configured to store learning data used for learning of the dialogue engine; and
    a controller configured to determine an actual user intention based on at least one of context information or an additional user speech, to match the spoken text, by which the dialogue engine failed to determine the user intention, with the actual user intention when the dialogue engine fails to determine the user intention corresponding to the spoken text, and to store the spoken text and the actual user intention in the storage,
    wherein the dialogue engine performs learning using the spoken text and the actual user intention that are stored in the storage,
    wherein the dialogue engine generates a system speech to confirm the determined actual user intention, and
    wherein the controller matches the spoken text, by which the dialogue engine failed to determine the user intention, with the actual user intention, and stores the spoken text and the actual user intention in the storage when a positive response from the user is input to the system speech.

2. The dialogue system of claim 1, wherein
    the dialogue engine performs the learning periodically or when a predetermined event occurs.

3. The dialogue system of claim 1, further comprising:
    a communicator configured to receive the context information from an electronic device registered in the dialogue system.

4. The dialogue system of claim 3, wherein
    the context information includes at least one of information on an operation of the electronic device executed after the user speech is input or information on a user's behavior.

5. The dialogue system of claim 3, wherein the dialogue engine outputs the system speech to confirm the determined user intention when determining the user intention is successful.

6. The dialogue system of claim 5, wherein the controller determines the actual intention of the user based on at least one of context information acquired before and after the user's speech is input or the additional user speech inputted after the system speech, and matches the spoken text with the actual user intention of the user and stores the spoken text in the storage when a negative user response is input to the determined user intention.

7. The dialogue system of claim 3, wherein the controller generates a control command for performing an action corresponding to the determined user intention when the controller succeeds in determining the user intention.

8. The dialogue system of claim 7, wherein the controller determines the actual user intention based on the received context information, matches the spoken text with the actual user intention, and stores the matched spoken text in the storage when the context information indicating the execution of an action opposite to the performed action and an additional action is received after the action corresponding to the determined user intention is performed.

9. The dialogue system of claim 8, wherein the controller matches and stores the user speech, the spoken text, and the actual user intention in the storage, and
    wherein the STT engine performs learning using the user speech, the spoken text, and the actual user intention stored in the storage.

10. A dialogue processing method, the method comprising:
    converting a user speech into a spoken text in a Speech to Text (STT) engine;
    determining a user intention corresponding to the spoken text based on learning in a dialogue engine;
    determining an actual user intention based on at least one of context information or an additional user speech;
    matching the spoken text, by which the dialogue engine failed to determine the user intention, with the actual user intention when the dialogue engine fails to determine user intention corresponding to the spoken text, and storing the spoken text and the actual user intention in a storage; and
    performing learning of the dialogue engine using the spoken text and the actual user intention that are stored in the storage,
    wherein the storing of the spoken text and the actual user intention comprising:
    generating system speech to confirm the determined actual user intention;
    matching the spoken text, by which the dialogue engine failed to determine the user intention, with the actual user intention, and storing the spoken text and the actual user intention in the storage when a positive response from the user is input to the system speech.

11. The method of claim 10, further comprising
    performing, by the dialogue engine, the learning periodically or when a predetermined event occurs.

12. The method of 11, further comprising
    receiving, by a communicator, the context information from an electronic device registered in a dialogue system.

13. The method of claim 12, wherein the context information includes at least one of information on an operation of the electronic device executed after the user speech is input or information on a user's behavior.

14. The method of claim 12, further comprising
    outputting the system speech to confirm the determined user intention when determining the user intention is successful.

15. The method of claim 14, further comprising:
    determining the actual user intention based on at least one of the context information acquired before and after the user's speech is input or the additional user speech inputted after the system speech when a negative user response is input to the determined user intention; and
    matching the spoken text with the actual user intention of the user and storing the spoken text in the storage.

16. The method of claim 12, further comprising
    generating a control command for performing an action corresponding to the determined user intention when the controller succeeds in determining the user intention.

17. The method of claim 16, further comprising:
    determining the actual user intention based on the received context information when the context information indicating the execution of an action opposite to the performed action and an additional action is received after the action corresponding to the determined user intention is performed; and matching the spoken text with the actual user intention and storing the spoken text in the storage.

18. The method of claim 10, further comprising:

matching and storing the user speech, the spoken text, and the actual user intention in the storage; and performing learning using the user speech, the spoken text, and the actual user intention stored in the storage.

* * * * *